Sept. 9, 1941. F. O. CARLSON 2,255,377
DIE PRESS
Filed Nov. 6, 1939  2 Sheets-Sheet 2
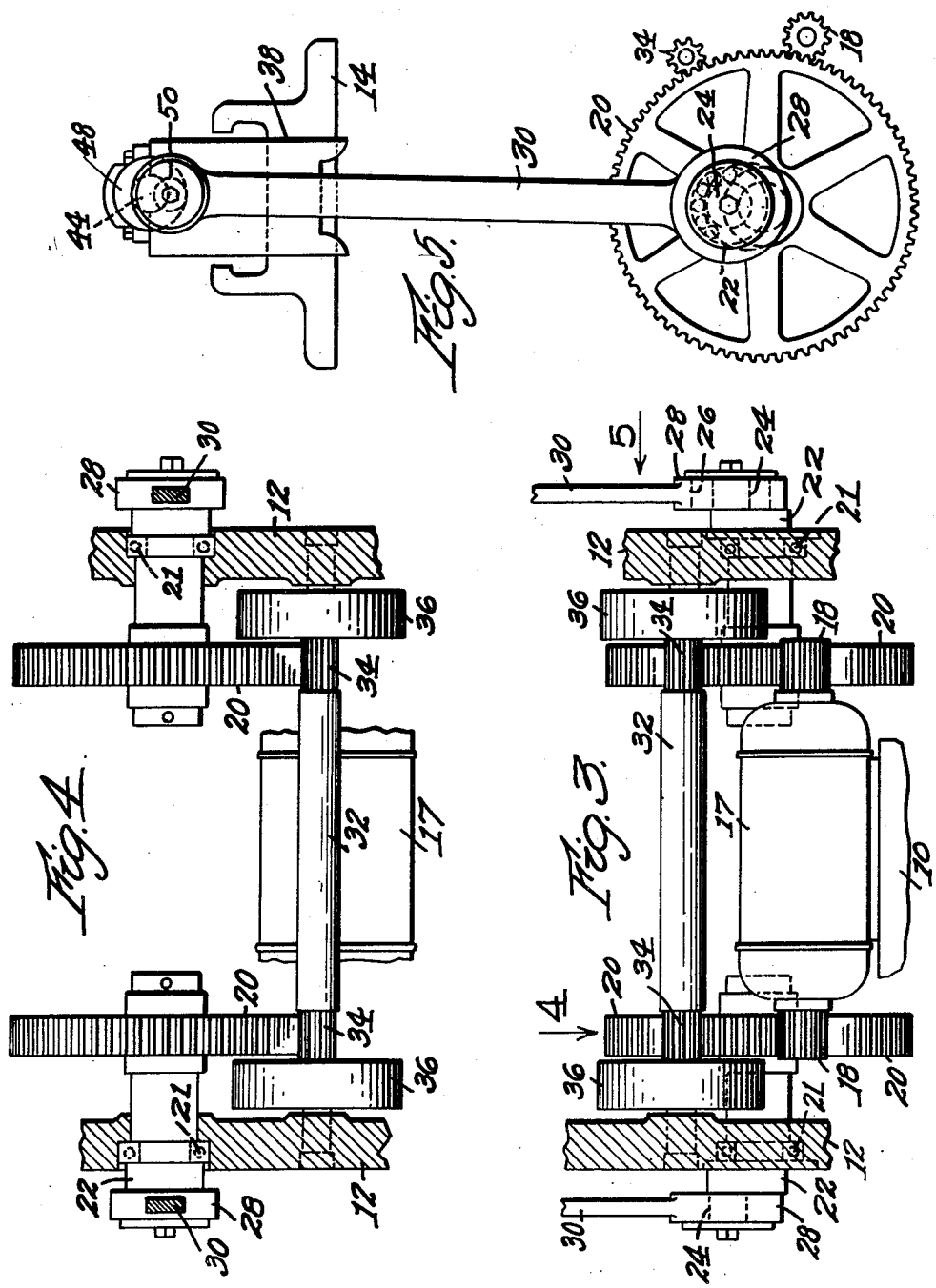
Inventor
Fritz O. Carlson.
By attorney
Chas. R. Fay Patented Sept. 9, 1941

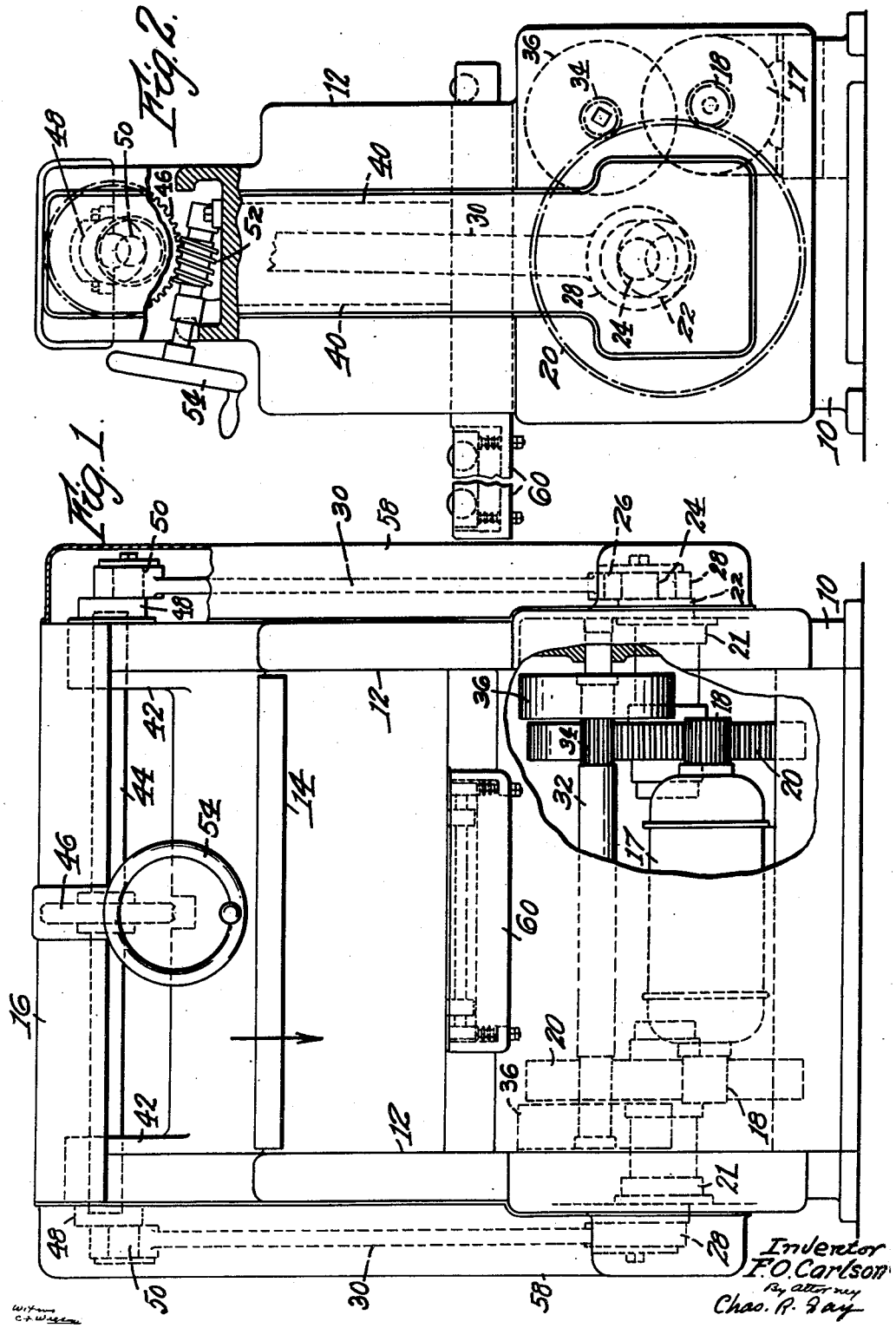

2,255,377

UNITED STATES PATENT OFFICE 2,255,377

DIE PRESS

Fritz O. Carlson, Worcester, Mass., assignor to Hobbs Manufacturing Company, Worcester, Mass., a corporation of Massachusetts Application November 6, 1939, Serial No. 303,034

9 Claims. (Cl. 164—106)

The subject matter of this invention relates to die presses, for the stamping or pressing of any desired material, such as paper, cardboard, leather, sheet metal, etc. The die itself does not form any part of the present invention, but may be made of any shape desired, and the platen is adapted to receive any die desired.

Objects of invention include the provision of a die press having a new and improved operating mechanism for a reciprocating device for the platen which is thereby driven with equalized force at its ends, said mechanism comprising a prime mover which may be self-contained, speed reducers at each side of the prime mover, and gearing from said reducers to a pair of crank arms, the latter being connected to the platen, together with means interconnecting said cranks to restrict them to equal and simultaneous forces and movements; the provision of a novel connection between the crank arms and the platen whereby the latter may be adjusted with respect to the bed of the press while the latter is operating, and in which the crank arms act as the sole reaction points for such adjustment; and the provision of means whereby the platen is supported against gravity solely by said crank arms.

Other objects and advantages of the invention will appear hereinafter.

Reference is to be had to the accompanying drawings, in which

Fig. 1 is a front elevation of the press embodying this invention;

Fig. 2 is a side elevation of the press shown in Fig. 1;

Fig. 3 is a front elevation with parts broken away, showing the gearing connections between the power source and the crank arms;

Fig. 4 is a plan view of the parts, looking in the direction of the arrow 4 shown in Fig. 3; and Fig. 5 is a side elevation of a crank and the platen, looking in the direction of arrow 5 in Fig. 3.

As shown in Figs. 1 and 2, the die press embodying the present invention is supported upon a base 10, and rising from said base there are end columns 12, each column providing bearing supports for the driving mechanism and lateral guideways for the vertically reciprocating die platen 14. The columns 12 are connected at their tops by the beam 16. All of these members are fabricated of heavy iron, and form an extremely strong and rigid framework.

The housing 17 encases a driving motor and similar speed reducers at each end thereof. The reducer shafts carry like pinions 18 which mesh with large heavy gears 20 journaled in the columns 12 on bearings 21 and driving the discs 22 and eccentrically mounted pins 24. The pins 24 are equipped with heavy bearings 26, which rotatably mount straps 28, and in turn, the straps 28 support and drive integral crank arms 30, each of which is connected at its upper end to an extremity of the platen 14.

A heavy solid shaft 32 is journaled at its ends in the columns 12, and this shaft has teeth 34 cut therein to mesh with the large gears 20. Between the teeth 34 and the journals for the shaft 32 there are mounted a pair of heavy balance wheels 36. As the gears 20 are interconnected in this manner, it is obvious that they must rotate in absolute uniformity, irrespective of the speed reducers and gears 18, and hence the arms 30 reciprocate the platen 14 by means of forces, delivered at the ends thereof, which are exactly equal in point of time and amount of power. This mechanism, therefore, provides for a pressing or stamping action of the platen which is always uniform from end to end thereof and which cannot vary in the slightest regardless of wear or length of use. This action is important since dies at the opposite working ends of the platen will always act upon the work exactly the same both as to power of impact and extent of stroke.

The platen 14 is provided with like end guides 38 mounted to reciprocate in vertical guideways 40 in the columns 12. These guides may be keyed to the guideways if desired. The platen itself is provided with upstanding bosses 42 from which the guides 38 extend, and these bosses rotatably mount a shaft 44. This shaft has rigidly secured thereto a central worm wheel 46 and end discs 48. Eccentric pins 50 extend outwardly from the discs 48, and these pins are identically angularly located with respect to the discs 48, and are centrally journaled in the upper ends of the arms 30. Thus the platen 14 is supported against gravity solely on the arms 30, and the gearing 18, 20 and especially the shaft 32 and balance wheels hold the arms 30 and platen 14 in whatever position the latter comes to rest upon interruption of the power.

The platen 14 is provided with a worm 52 journaled at its ends thereon, and having a hand wheel 54, the worm meshing with the wheel 46. It is to be noted that the shaft 44, pins 50, and gears 46, 52 are vertically reciprocated with the platen. If the latter is desired to be vertically adjusted, the hand wheel 54 is turned, thus rotating the shaft 44 and laterally moving the ends of the arms 30 (about the centers of straps 28)

through the rotation of the eccentric pins 50. When the pins 50 rotate about the shaft 44 as a center, it will be seen that the platen 14 and the arms 30 must relatively move in a vertical direction, and as the driving mechanism prevents the arms 30 from moving vertically the platen must move. In other words, the pins 50 and the upper ends of arms 30 may move laterally, but cannot move vertically except under influence of the motor. Hence, dependent upon the direction of rotation of the hand wheel 54, the platen is moved up or down in its guideways, and the upper ends of arms 30 form the reaction points for the adjustment, as well as the support for the platen. Even though the platen reciprocates, the operator may turn the hand wheel 54 during the operation, and the press does not have to be stopped to make an adjustment; the adjustment of the platen is of course independent of the vertical position of the arms 30.

The arms 30 are covered by detachable casings 58 and a roller table 60 is provided for passage of the material to be stamped.

From the foregoing it is seen that a self-contained die press of great flexibility and increased speed in operation is provided and the adjustment of the platen and the driving mechanism have been simplified and improved. The platen gives a uniform impact throughout its extent and cannot vary in this respect regardless of use or wear of the parts.

Having thus described my invention and the advantages thereof, I do not wish to be limited to the details herein disclosed, otherwise than as set forth in the claims, but what I claim is:

1. In an apparatus of the class described, a base, columns rising from each end of said base, a power source on said base, a gear wheel journaled in each column, said power source operatively connected to drive said wheels, a shaft extending between and journaled at its ends in said columns, said shaft being provided with teeth meshing with each of said wheels, and balance wheels on said shaft.

2. In a die press, a base, end columns rising from said base, a gear wheel journaled independently in each column and driven from said power source, a shaft journaled in both columns, teeth on said shaft meshing with each wheel, a platen, and driving means for said platen extending from each wheel to each end of said platen.

3. In an apparatus of the class described, a base, columns rising from each end of said base, a power source on said base, a gear wheel journaled in each column, said power source operatively connected to drive said wheels, a shaft extending between and journaled at its ends in said columns, said shaft being provided with teeth meshing with each of said wheels, balance wheels on said shaft, pins eccentrically connected to said wheels, and crank arms journaled on and driven through said pins.

4. In an apparatus of the class described, a base, columns rising from each end of said base, a power source on said base, a gear wheel journaled in each column, said power source operatively connected to drive said wheels, a shaft extending between and journaled at its ends in said columns, said shaft being provided with teeth meshing with each of said wheels, balance wheels on said shaft, pins eccentrically connected to said wheels, crank arms journaled on and driven through said pins, said columns having vertical guideways therein, an element movably guided in said guideways and connected to said crank arms to be supported and driven thereby.

5. In an apparatus of the class described, a base, columns rising from each end of said base, a power source on said base, a gear wheel journaled in each column, said power source operatively connected to drive said wheels, a shaft extending between and journaled at its ends in said columns, said shaft being provided with teeth meshing with each of said wheels, and balance wheels on said shaft, pins eccentrically connected to said wheels, crank arms journaled on and driven through said pins, said columns having vertical guideways therein, and element movably guided in said guideways and connected to said crank arm to be supported and driven thereby, the connection between said crank arms and said element being adjustable whereby the latter may be vertically adjusted relative to said base.

6. In an apparatus of the class described, two driving members and a driven member, said driving members having adjustable connections to opposite ends of said driven member, said connections comprising a shaft journaled on said driven member, an integral disc adjacent each end of said shaft, an eccentric pin on each disc located in corresponding angular position thereon, each said pin being journaled in its corresponding driving member, means to turn the shaft, and means to prevent vertical movement of the driving members due to said connections.

7. In an apparatus of the class described, a base, a power source on said base, a driving element adapted to be reciprocated by said power source, a member mounted for reciprocation with respect to said base, means connecting said member and said driving element, said means comprising a pin journaled in said element, a shaft on which said pin is eccentrically mounted, said shaft being mounted on said member, and means to turn said shaft, the stroke of said driving element and the length of throw of said member remaining unaffected by rotation of said shaft, whereby said member is adjustable along said driving element to vary the position of its range of reciprocation.

8. In an apparatus of the class described, a support, a power source on said support, a driving arm connected at one end to said power source and adapted to be reciprocated thereby, a member mounted for reciprocation with respect to said support and mounted on the other end of said arm, a pin journaled at said other end of said arm, a shaft mounted for rotation on said member, said pin being rigid with said shaft and eccentric thereto, and means to turn said shaft, to selectively move said member along said arm to and from said base while leaving the length of throw of said member and arm constant.

9. In an apparatus of the class described, a support, a power source on said support, a driving rod connected at one end to said power source and adapted to be reciprocated thereby, a member mounted for reciprocation relative to said support, a connection between said driving arm and said member, said connection being effective to mount said member directly on said arm and providing means to adjust said member along said rod to change its location of action while leaving the length of throw of said rod unaffected, said means comprising a shaft on said member, a pin eccentric to said shaft and journaled in said rod, and means to turn said shaft.

FRITZ O. CARLSON.